US010761991B2

(12) United States Patent
Liu et al.

(10) Patent No.: US 10,761,991 B2
(45) Date of Patent: Sep. 1, 2020

(54) APPARATUS AND METHODS FOR CIRCULAR SHIFT OPERATIONS

(71) Applicant: Cambricon Technologies Corporation Limited, Beijing (CN)

(72) Inventors: Daofu Liu, Beijing (CN); Xiao Zhang, Beijing (CN); Shaoli Liu, Beijing (CN); Tianshi Chen, Beijing (CN); Yunji Chen, Beijing (CN)

(73) Assignee: CAMBRICON TECHNOLOGIES CORPORATION LIMITED, Beijing (CN)

(*) Notice: Subject to any disclaimer, the term of this patent is extended or adjusted under 35 U.S.C. 154(b) by 0 days.

(21) Appl. No.: 16/171,363

(22) Filed: Oct. 26, 2018

(65) Prior Publication Data

US 2019/0129858 A1 May 2, 2019

Related U.S. Application Data

(63) Continuation-in-part of application No. PCT/CN2016/080961, filed on May 4, 2016.

(30) Foreign Application Priority Data

Apr. 26, 2016 (CN) .......................... 2016 1 0266747

(51) Int. Cl.
*G06F 12/08* (2016.01)
*G06F 9/30* (2018.01)
*G06F 12/0875* (2016.01)
*G06N 3/02* (2006.01)

(52) U.S. Cl.
CPC ............ *G06F 12/0875* (2013.01); *G06F 9/30* (2013.01); *G06N 3/02* (2013.01); *G06F 2212/452* (2013.01)

(58) Field of Classification Search
CPC ................................... G06F 12/08; G06F 9/30
See application file for complete search history.

(56) References Cited

U.S. PATENT DOCUMENTS 9,928,887 B2 * 3/2018 Tiwari ................ G11C 11/4091

FOREIGN PATENT DOCUMENTS

| CN | 1349159 A | 5/2002 |
| CN | 1584824 A | 2/2005 |

(Continued)

OTHER PUBLICATIONS 201610266747.0—Office Action, dated Apr. 22, 2019, 7 pages. (no English translation).

(Continued)

*Primary Examiner* — David E Martinez
(74) *Attorney, Agent, or Firm* — Getech Law LLC; Jun Ye

(57) ABSTRACT

Aspects for vector circular shifting in neural network are described herein. The aspects may include a direct memory access unit configured to receive a vector that includes multiple elements. The multiple elements are stored in a one-dimensional data structure. The direct memory access unit may store the vector in a vector caching unit. The aspects may further include an instruction caching unit configured to receive a vector shifting instruction that includes a step length for shifting the elements in the vector. Further still, the aspects may include a computation module configured to shift the elements of the vector toward one direction by the step length.

22 Claims, 4 Drawing Sheets

(56) References Cited

FOREIGN PATENT DOCUMENTS

CN 102495724 A 6/2012
WO WO 2017/185384 A1 11/2017

OTHER PUBLICATIONS

PCT/CN2016/080961—International Search Report, dated Jan. 26, 2017, 9 pages. (no English translation).
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X An Accelerator for Sparse Neural Networks", The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

\* cited by examiner

APPARATUS AND METHODS FOR CIRCULAR SHIFT OPERATIONS

CROSS-REFERENCE TO RELATED APPLICATIONS

The present invention is a continuation-in-part of PCT Application No. PCT/CN2016/080961, filed on May 4, 2016, which claims priority to commonly owned CN application number 201610266747.0, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, shifting a vector may be performed frequently in deep learning processes in MMNs.

A known method to shift a vector in a multilayer artificial neural network is to use a general-purpose processor. However, one of the defects of the method is low performance of a single general-purpose processor which cannot meet performance requirements for usual multilayer neural network operations with respect to a vector with a large number of elements.

Another known method to shift a vector of the multilayer artificial neural network is to use a graphics processing unit (GPU). Such a method uses a general-purpose register file and a general-purpose stream processing unit to execute general purpose single-instruction–multiple-data (SIMD) instructions to support the algorithms in MNNs. However, since GPU only contains rather small on-chip caching, then data of the vector elements may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for shifting a vector in a neural network. The example apparatus may include a direct memory access unit configured to receive a vector that includes multiple elements. The multiple elements are stored in a one-dimensional data structure. The direct memory access unit may store the vector in a vector caching unit. The example apparatus may further include an instruction caching unit configured to receive a vector shifting instruction that includes a step length for shifting the elements in the vector. Further still, the example apparatus may include a computation module configured to shift the elements of the vector toward one direction by the step length.

Another example aspect of the present disclosure provides an example method for shifting a vector in a neural network. The example method may include receiving, by a direct memory access unit, a vector that includes multiple elements, wherein the multiple elements are stored in a one-dimensional data structure; storing, by the direct memory access unit, the vector in a vector caching unit; receiving, by an instruction caching unit, a vector shifting instruction that includes a step length for shifting the elements in the vector; and shifting, by a computation module, the elements of the vector toward one direction by the step length.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described.

Besides, identical reference numbers refer to identical function and operation throughout the accompanying drawings.

Shifting a vector may be performed in a neural network. A vector may refer to one or more values formatted in a one-dimensional data structure. The values included in a vector may be referred to as elements. The number of the elements in the vector may be referred to as a length of the vector. A vector may be represented as A(1), A(2), . . . A(n−m), A(n−m+1), . . . A(n). In some example, the elements may be shift right by a step length, e.g., m. The shifted vector may be shown as A(n−m+1), . . . A(n), A(1), A(2), . . . , A(n−m).

Figure 1:
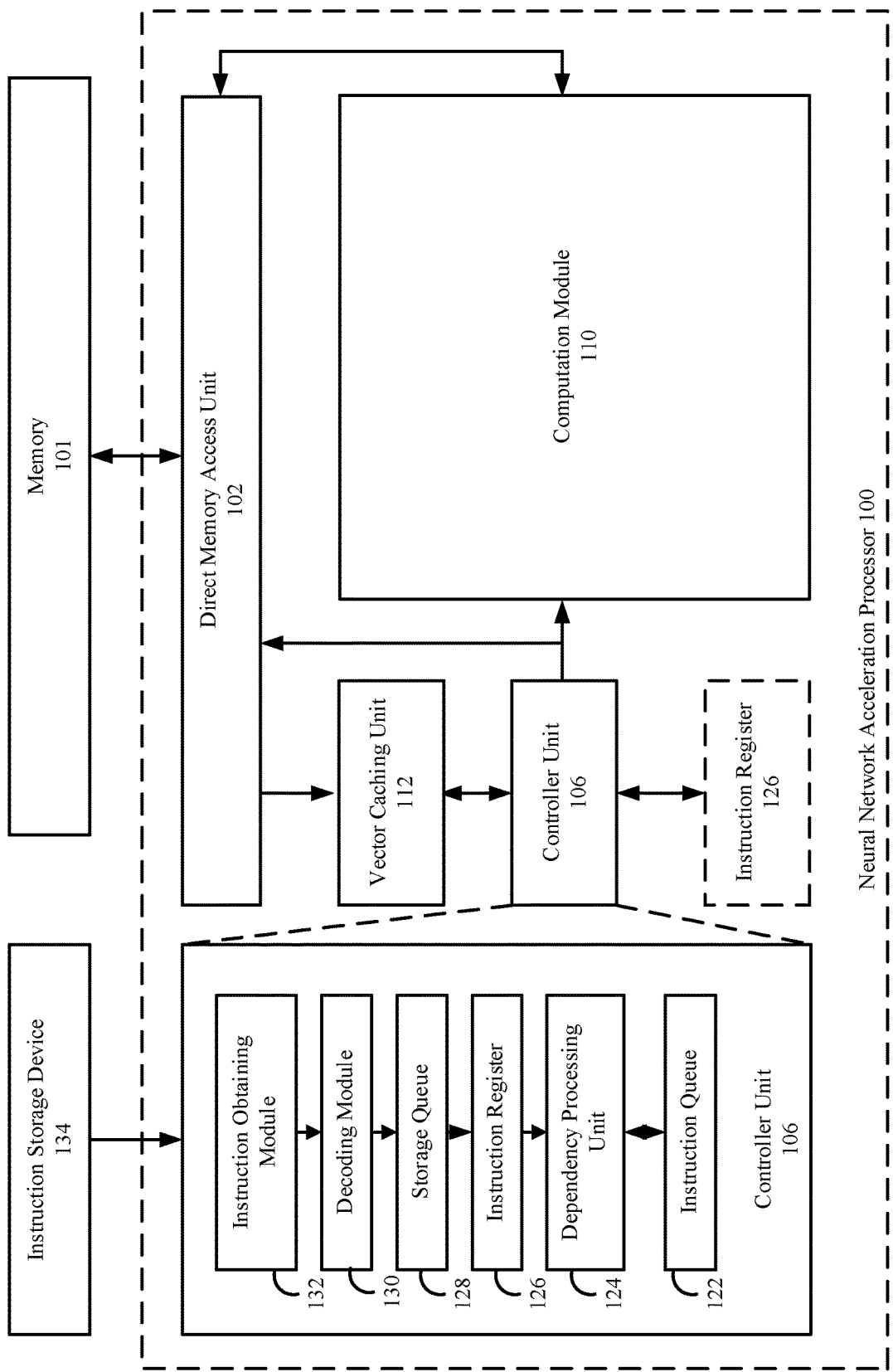
FIG. 1 illustrates a block diagram of an example neural network acceleration processor by which vector shifting may be implemented in a neural network.

FIG. 1 illustrates a block diagram of an example neural network acceleration processor by which vector shifting may be implemented in a neural network. As depicted, the example neural network acceleration processor 100 may include a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a vector shifting instruction may originate from an instruction storage device 134 to the controller unit 106. An instruction obtaining module 132 may be configured to obtain a vector shifting instruction from the instruction storage device 134 and transmit the instruction to a decoding module 130.

The decoding module 130 may be configured to decode vector shifting the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a vector shifting instruction, for example, may include one or more operation fields. The operation fields may respectively include an address of a vector, a length of the vector, an address of an output vector, and a step length. As depicted, in some examples, the instruction register 126 may be implemented by one or more registers external to the controller unit 106. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode the vector shifting instruction into micro-instructions for controlling operations of other modules including the direct memory access unit 102 and the computation module 110.

The direct memory access unit 102 may be configured to access an external address range (e.g., in an external storage device such as a memory 101) and directly read or write vector data into respective caching units in the computation module 110 in accordance with the received instruction.

Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Upon receiving the vector shifting instruction from the controller unit 106 and the data of the vector from the vector caching unit 112, the computation module 110 may be configured to duplicate a portion of the vector to an element caching unit. Assuming the step length is m elements, which indicates that the computation module 110 is instructed to shift the vector to right by m elements, the computation module 110 may first duplicate the m elements from the right to an element caching unit. Further, the computation module 110 may be move the rest of the elements to the right of the vector and copy the m elements from the element caching unit to the left of the vector. The shifted vector may be also stored in the vector caching unit 112 as an output vector.

Figure 2:
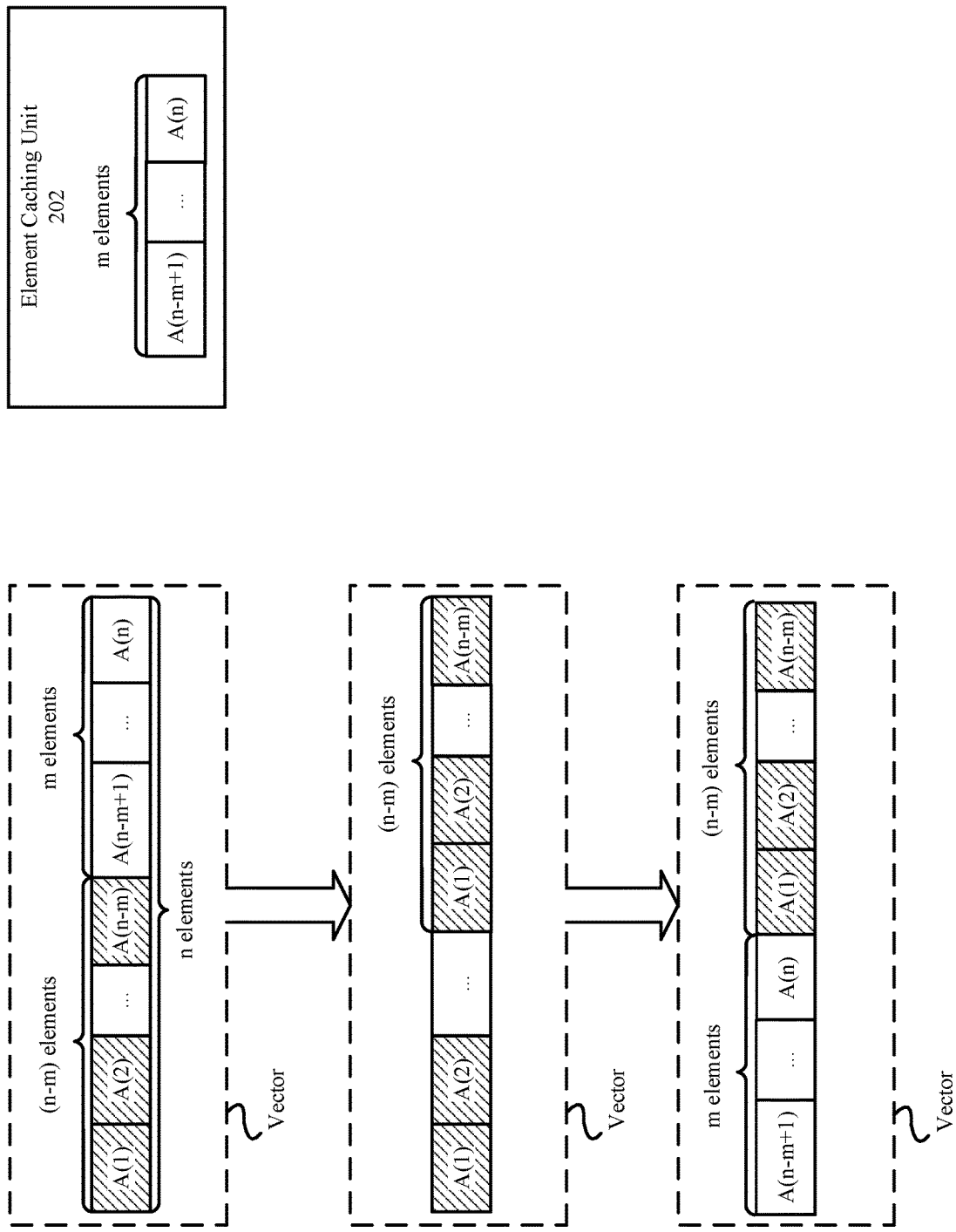
FIG. 2 illustrates an example vector shifting of a vector that may be performed by the example neural network acceleration processor.

FIG. 2 illustrates an example vector shifting of a vector that may be performed by the example neural network acceleration processor.

As depicted, the vector may include a number of elements, e.g., n. The vector may be shown as A(1), A(2), . . . A(n−m), A(n−m+1), . . . A(n). The vector shifting instruction may include a step length, e.g., m elements.

According to the vector shifting instruction, the computation module 110 maybe configured to shift the elements in the vector to the right for m elements. In more detail, the computation module 110 may be configured to first duplicate the m elements from the right (e.g., A(n−m+1) . . . A(n)) to an element caching unit 202. The computation unit 110 may further overwrite the (n−m) elements from the right with the (n−m) element from the left (e.g., A(1), A(2), . . . A(n−m)). The computation module 110 may then be configured to copy the m elements from the element caching unit 202 to overwrite the m elements from the left of the vector.

Figure 3:
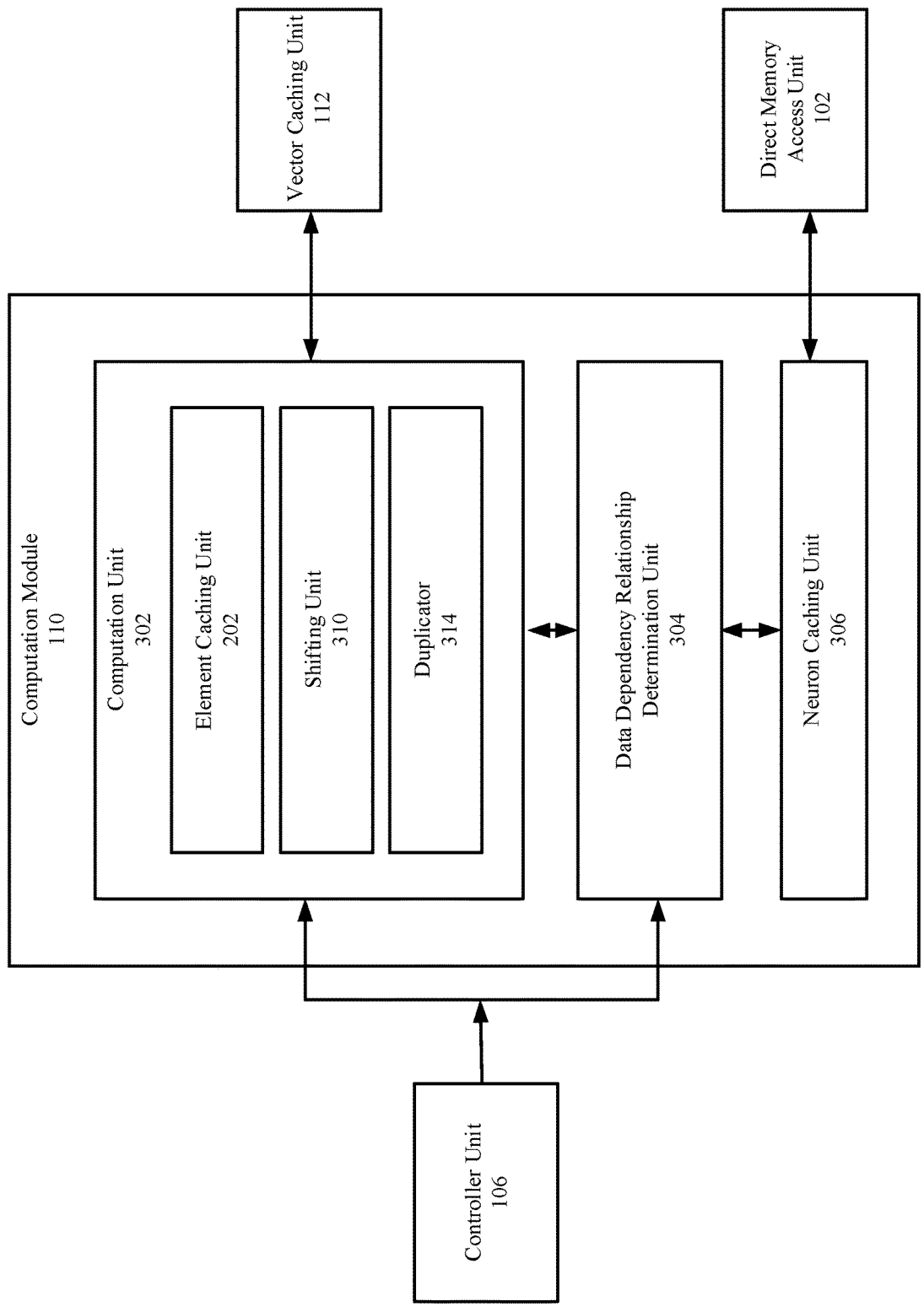
FIG. 3 illustrates an example computation module in the example neural network acceleration processor by which vector shifting may be implemented in a neural network.

FIG. 3 illustrates an example computation module in the example neural network acceleration processor by which vector shifting may be implemented in a neural network.

As depicted, the computation module 110 may include a computation unit 302, a data dependency relationship determination unit 304, a neuron caching unit 306. The computation unit 302 may further include an element caching unit 202, a shifting unit 310, and a duplicator 314.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the vector.

The computation unit 302 may be configured to receive the micro-instructions decoded from the vector shifting instruction from the controller unit 106. In the example that the micro-instructions instruct the computation module 110 to perform a vector shifting operation to the vector, the duplicator 314 may be configured to duplicate the m elements from the right (e.g., A(n−m+1) . . . A(n)) to the element caching unit 202. The shifting unit 310 may then be configured to overwrite the (n−m) elements from the right with the (n−m) element from the left (e.g., A(1), A(2), . . . A(n−m)). Subsequently, the duplicator 314 may be configured to copy the m elements from the element caching unit 202 to overwrite the m elements from the left of the vector to generate a shifted vector.

Figure 4:
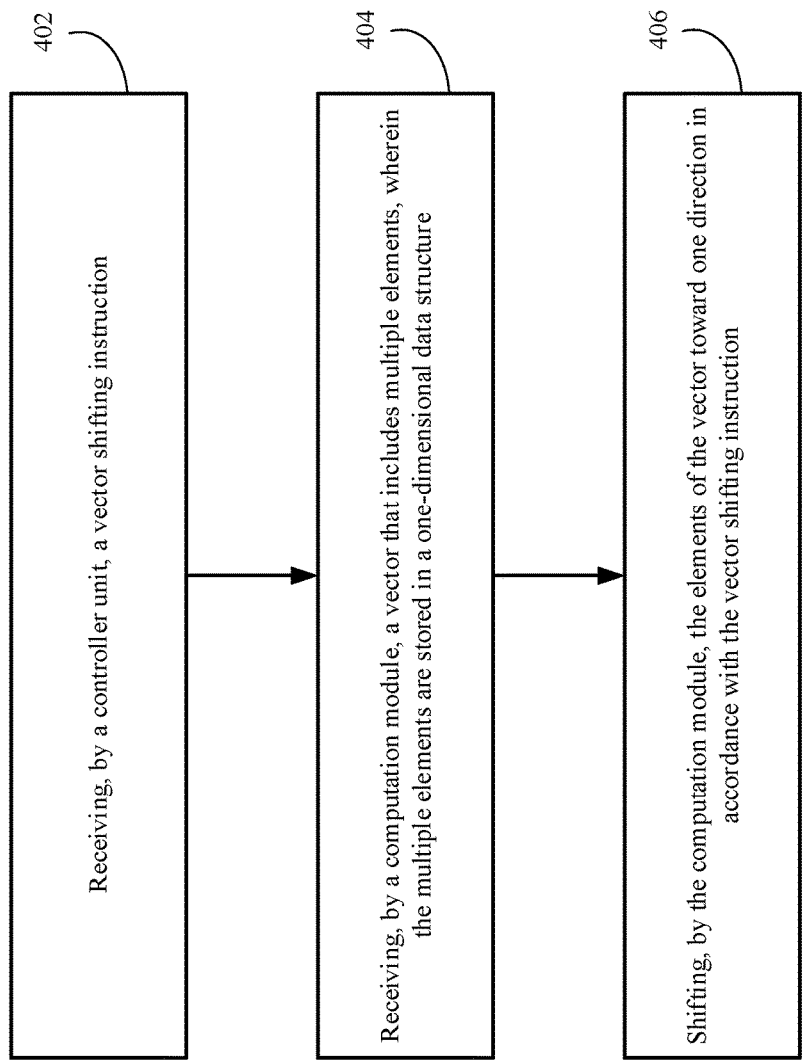
FIG. 4 illustrates flow chart of an example method for vector shifting in a neural network.

FIG. 4 illustrates flow chart of an example method 400 for vector shifting in a neural network. The method 400 may be performed by one or more components of the apparatus of FIGS. 1 and 3.

At block 402, the example method 400 may include receiving, by a controller unit, a vector shifting instruction. For example, the controller unit 106 may be configured to receive a vector shifting instruction from the instruction storage device 134.

At block 404, the example method 400 may include receiving, by a computation module, a vector that includes multiple elements, wherein the multiple elements are stored in a one-dimensional data structure. For example, the computation module 110 may be configured to receive a vector including multiple elements from the memory 101. The vector may be represented as A(1), A(2), . . . A(n−m), A(n−m+1), . . . A(n).

At block 406, the example method 400 may include shifting, by the computation module, the elements of the vector toward one direction in accordance with the vector shifting instruction. For example, the duplicator 314 of the computation module 110 may be configured to duplicate the m elements from the right (e.g., A(n−m+1) . . . A(n)) to the element caching unit 202. The shifting unit 310 of the computation module 110 may then be configured to overwrite the (n−m) elements from the right with the (n−m) element from the left (e.g., A(1), A(2), . . . A(n−m)).

Subsequently, the duplicator 314 may be configured to copy the m elements from the element caching unit 202 to overwrite the m elements from the left of the vector to generate a shifted vector.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector shifting in a neural network, comprising:
   a controller unit configured to receive a vector shifting instruction, wherein the controller unit further comprises an instruction queue module configured to temporarily store the vector shifting instruction and one or more previously received instructions, and retrieve information corresponding to operation fields in the vector shifting instruction; and a computation module configured to:
  receive, in response to the vector shifting instruction, a vector that includes multiple elements, wherein the multiple elements are stored in a one-dimensional data structure, and
  shift, in response to the vector shifting instruction, the elements of the vector toward one direction in accordance with the vector shifting instruction, wherein the vector shifting instruction includes a step length for shifting the elements in the vector.

2. The apparatus of claim 1, wherein the computation module includes an element caching unit configured to temporarily store one or more of the elements.

3. The apparatus of claim 2, wherein the computation module is configured to duplicate a first portion of the elements to the element caching unit.

4. The apparatus of claim 3, wherein the computation module is further configured to overwrite the first portion of the elements in the vector caching unit with a second portion of the elements.

5. The apparatus of claim 4, wherein the computation module is further configured to
  retrieve the first portion of the elements from the element caching unit, and
  overwrite the second portion of the elements stored at an initial address in the vector caching unit with the retrieved first portion of the elements.

6. The apparatus of claim 1, wherein the controller unit comprises an instruction obtaining module configured to obtain the vector shifting instruction from an instruction storage device.

7. The apparatus of claim 6, wherein the controller unit further comprises a decoding module configured to decode the vector shifting instruction into one or more micro-instructions.

8. The apparatus of claim 7, wherein the controller unit further comprises an instruction register configured to store the information corresponding to the operation fields in the vector shifting instruction.

9. The apparatus of claim 8, wherein the controller unit further comprises a dependency processing unit configured to determine whether the vector shifting instruction has a dependency relationship with the one or more previously received instructions.

10. The apparatus of claim 9, wherein the controller unit further comprises a storage queue module configured to store the vector shifting instruction while the dependency processing unit is determining whether the vector shifting instruction has the dependency relationship with the one or more previously received instructions.

11. The apparatus of claim 1, wherein the vector shifting instruction includes a length of the vector.

12. A method for vector shifting in a neural network, comprising:

receiving, by a controller unit, a vector shifting instruction;

temporarily storing, by an instruction queue module of the controller unit, the vector shifting instruction and one or more previously received instructions;

retrieving, by the instruction queue module, information corresponding to operation fields in the vector shifting instruction;

receiving, by a computation module in response to the vector shifting instruction, a vector that includes multiple elements, wherein the multiple elements are stored in a one-dimensional data structure; and shifting, by the computation module in response to the vector shifting instruction, the elements of the vector toward one direction in accordance with the vector shifting instruction, wherein the vector shifting instruction includes a step length for shifting the elements in the vector.

13. The method of claim 12, wherein the computation module includes an element caching unit configured to temporarily store one or more of the elements.

14. The method of claim 13, wherein the shifting further comprises duplicating, by the computation module, a first portion of the elements to the element caching unit.

15. The method of claim 14, wherein the shifting further comprises overwriting, by the computation module, first portion of the elements in the vector caching unit with a second portion of the elements.

16. The method of claim 15, wherein the shifting further comprises:
  retrieving, by the computation module, the first portion of the elements from the element caching unit; and
  overwriting, by the computation module, the second portion of the elements stored at an initial address in the vector caching unit with the retrieved first portion of the elements.

17. The method of claim 12, wherein the vector shifting instruction includes a length of the vector.

18. The method of claim 12, further comprising obtaining, by an instruction obtaining module of the controller unit, the vector shifting instruction from an instruction storage device.

19. The method of claim 18, further comprising decoding, by a decoding module of the controller unit, the vector shifting instruction into one or more micro-instructions.

20. The method of claim 19, further comprising storing, by an instruction register of the controller unit, the information corresponding to the operation fields in the vector shifting instruction.

21. The method of claim 20, further comprising determining, by a dependency processing unit of the controller unit, whether the vector shifting instruction has a dependency relationship with the one or more previously received instructions.

22. The method of claim 21, further comprising storing, by a storage queue module of the controller unit, the vector shifting instruction while the dependency processing unit is determining whether the vector shifting instruction has the dependency relationship with the one or more previously received instructions.

* * * * *